United States Patent [19]

Nakagawa et al.

[11] Patent Number: 4,587,316

[45] Date of Patent: May 6, 1986

[54] FLUORINE-CONTAINING COPOLYMERS AND FILMS THEREOF

[75] Inventors: Shinichi Nakagawa, Nara; Tsuneo Nakagawa, Osaka; Toshihiko Amano, Osaka; Mitsugu Omori, Osaka; Sadaatsu Yamaguchi, Osaka; Kozo Asano, Osaka, all of Japan

[73] Assignee: Daikin Kogyo Co., Ltd., Osaka, Japan

[21] Appl. No.: 575,673

[22] Filed: Jan. 31, 1984

[30] Foreign Application Priority Data

Feb. 1, 1983 [JP] Japan ................................ 58-15592

[51] Int. Cl.$^4$ .................... C08F 214/26; C08F 214/28
[52] U.S. Cl. .................................................. 526/247
[58] Field of Search ........................................ 526/247

[56] References Cited

U.S. PATENT DOCUMENTS 4,262,101  4/1981  Hartwimmer et al. .............. 526/247

Primary Examiner—Harry Wong, Jr.
Attorney, Agent, or Firm—Birch, Stewart, Kolasch & Birch

[57] ABSTRACT

A fluorine-containing copolymer comprising monomeric units of
(a) tetrafluoroethylene,
(b) 8 to 15% by weight of hexafluoropropene on the basis of the weight of the copolymer, and
(c) 0.2 to 2% by weight of a fluoroalkyl vinyl ether of the formula:

$$CF_2=CF-O-(CF_2)_n-CF_2X \qquad (I)$$

wherein X is hydrogen or fluorine, and n is an integer of 3 to 9 on the basis of the weight of the copolymer, which has improved stress crack resistance, and flex resistance as well as good moldability.

5 Claims, No Drawings

FLUORINE-CONTAINING COPOLYMERS AND FILMS THEREOF

This invention relates to a fluorine-containing copolymer. More particularly, it relates to a fluorine-containing copolymer comprising units of tetrafluoroethylene (herein after referred to as "TFE"), hexafluoropropene (hereinafter referred to as "HFP") and a certain specific fluoroalkyl vinyl ether, which copolymer has good melt moldability and molded articles and films derived therefrom have improved stress crack resistance and flex resistance.

It is known that a copolymer of TFE and HFP (hereinafter referred to as "FEP" copolymer) is melt extrudable (cf. U.S. Pat. Nos. 2,549,935 and 2,598,283). Although molded articles and films of FEP copolymer has excellent heat resistance, weather resistance and chemical resistance, its stress crack resistance is inferior. In order to improve the stress crack resistance the melt viscosity of the FEP copolymer should be increased. However, a high melt viscosity results in a deteriorated melt moldability.

To overcome the above drawbacks of a FEP copolymer, it is proposed to incorporate, as the third monomeric component, about 0.5 to 3% by weight of a perfluoroalkyl vinyl ether of the formula:

$$CF_2=CF-O-(CF_2)_m-CF_3$$

wherein m is 1 or 2, on the basis of the weight of the copolymer (cf. U.S. Pat. No. 4,029,868). However, this perfluoroalkyl vinyl ether is expensive and should be incorporated in a relatively large amount in order to attain the desired improvements, which is not economically advantageous.

Japanese Patent Publication (unexamined) No. 29389/1978 describes copolymers of TFE, HEP and various kinds of fluoroalkyl vinyl ethers including the above fluoroalkyl vinyl ether, the composition of which is 90.5 to 99.8% by mole of TFE, 5.0 to 0.3% by mole of HFP and 4.5 to 0.4% by mole of fluoroalkyl vinyl ether. Films derived from such copolymers, however, have the same drawbacks as described above and, due to a smaller amount of HFP, they have inferior flex resistance to those containing a comparatively larger amount of HFP and the same amount of fluoroalkyl vinyl ether.

As a result of extensive study to overcome the drawbacks of the FEP copolymer, it has now been found that copolymerization of a small amount of a certain specific fluoroalkyl vinyl ether as the third monomeric component with TFE and HEP affords a fluorine-containing copolymer has good moldability and molded articles and films derived therefrom have improved stress crack resistance, and flex resistance.

According to the present invention, there is provided a fluorine-containing copolymer comprising monomeric units of
(a) TFE,
(b) 8 to 15% by weight of HFP on the basis of the weight of the copolymer, and
(c) 0.2 to 2% by weight of a fluoroalkyl vinyl ether of the formula:

$$CF_2=CF-O-(CF_2)_n-CF_2X \qquad (I)$$

wherein X is hydrogen or fluorine, and n is an integer of 3 to 9, preferably of 3 to 7, on the basis of the copolymer.

Since the copolymer according to the invention contains the fluoroalkyl vinyl ether (I) as the third monomeric comonent and a relatively large amount of HFP, the amount of the vinyl ether can be diminished in order to attain the same degree of the improvement over the drawbacks of the FEP copolymer as compared with the conventional copolymers. In addition, an article formed from the copolymer, according to the invention, has excellent stress crack resistance and flex resistance. For example, the stress crack resistance of the said article of an FEP copolymer having a lower molecular weight or melt viscosity, especially of lower than $4 \times 10^4$ is greatly deteriorated while the article of the copolymer according to the invention has good stress crack resistance and MIT flex resistance even when the copolymer has melt viscosity of from $0.5 \times 10^4$ to $4 \times 10^4$ poise and good moldability.

Preferably, the copolymer according to the invention has a specific melt viscosity of at least $0.5 \times 10^4$ poise, more preferably at least $1 \times 10^4$ poise.

The film of the copolymer according to the invention has good flex resistance and preferably is not broken after 3,000 cycles, more preferably 5,000 cycles of bending when subjected to the MIT flex resistance test, as defined below.

The fluoroalkyl vinyl ether (I) is prepared by a known process described in, for example, U.S. Pat. No. 3,321,532.

For the production of the copolymer according to the invention, various conventional polymerization methods and conditions can be adopted. Any of bulk polymerization, solution polymerization, suspension polymerization and emulsion polymerization may be employed. Polymerization is generally initiated by the presence of a polymerization initiator in the polymerization system. Any initiator that does not deteriorate the thermal properties of the resulting copolymer can be employed. For example, highly fluorinated peroxides of the formula:

$$(R_fCOO)_2$$

wherein Rf is a perfluoroalkyl, omega-hydroperfluoroalkyl or perchlorofluoroalkyl are preferred.

In order to facilitate contact between the monomers, a reaction medium can be used. Specific examples of the medium are halogenated hydrocarbons (eg. 1,1,2-trichloro-1,2,2-trifluoroethane, 1,2-dichloro-1,1,2,2-tetrafluoroethane, trichlorofluoromethane, dichlorodifluoromethane, perfluorocyclobutane, HFP dimer, etc.), benzene, diphenyl, cyclohexane, water, acetic acid, acetonitrile and the like.

The copolymerization is preferably effected in the presence of a chain transfer agent which is used in conventional radical polymerization in order to control the molecular weight of the polymer. Specific examples of the chain transfer agent are isoparaffin, carbon tetrachloride, diethyl malonate, mercaptan, diethy ether, alcohols, and so forth. If necessary, a polymerization stabilizer (eg. methylcellulose, polyvinyl alcohol, etc.) and a pH adjuster (eg. phosphoric acid-phosphate buffer, boric acid-barate buffer, etc.) may be added to the polymerization system.

Other polymerization conditions such as the reaction temperature and the reaction pressure are not critical and may be the same as those employed in the conventional polymerization of TFE and HFP. Generally, the reaction temperature is from 10° to 50° C., preferably from 20° to 40° C., and more preferably a temperature around room temperature. The reaction pressure may be from 5 to 25 Kg/cm$^2$G, usually an autogenic pressure of the monomers.

The composition of the monomeric units in the copolymer according to the invention is usually 8 to 15% by weight of HFP, 0.2 to 2% by weight of the fluoroalkyl vinyl ether (I) and the remainder of TFE, preferably 9 to 13% by weight of HFP, 0.3 to 1.5% by weight of the fluoroalkyl vinyl ether (I) and the remainder of TFE. When the amount of the fluoroalkyl vinyl ether (I) is less than 0.2% by weight, stress crack resistance of the article derived from the copolymer is not desirably improved. It is possible to copolymerize more than 2% by weight of the fluoroalkyl vinyl ether (I) with TFE and HFP, but this is not advantageous for economical reasons.

The present invention will be hereinafter explained in further detail by way of the following Examples, wherein parts and % are by weight unless otherwise indicated.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

Characteristics and physical properties of the copolymers obtained in Examples are measured as follows:

(a) Composition of copolymer

Contents of the fluoroalkyl vinyl ether (I) and HFP are determined by measuring infrared spectrum of a film of 0.040±0.005 mm in thickness, which has been formed at 350° C., by means of a infrared spectrophotometer (IP-440 made by Shimadzu).

Characteristic absorbance for the fluoroalkyl vinyl ether (I), for example, a compound of the formula:

$$CF_2=CF-O-(CF_2)_3-CF_3$$

(hereinafter referred to as "n-3VE") is found at 895 cm$^{-1}$, and its content is calculated from the absorbance at 2,350 cm$^{-1}$ and that at 895 cm$^{-1}$ according to the following equation:

$$\text{n-3VE content (\%)} = 1.7 \times \frac{D_{895\ cm^{-1}}}{D_{2,350\ cm^{-1}}}$$

wherein $D_{895}$ cm$^{-1}$ is the absorbance at 895 cm$^{-1}$ and $D_{2,350}$ cm$^{-1}$ is that at 2,350 cm$^{-1}$.

The content of HFP is calculated from the absorbance at 980 cm$^{-1}$ according to the following equation:

$$\text{HFP content (\%)} = 3.2 \times \frac{D_{980\ cm^{-1}}}{D_{2,350\ cm^{-1}}}$$

wherein $D_{890}$ cm$^{-1}$ is the absorbance at 890 cm$^{-1}$ and $D_{2,350}$ cm$^{-1}$ is the same as defined above.

(b) Specific melt viscosity

A Koka-type flow tester is used. A copolymer is charged in a cylinder of 11.3 mm in inner diameter and kept at 380° C. for 5 minutes. Then, the copolymer is extruded from an orifice of 2.1 mm in inner diameter and 8 mm in length under piston load of 7 Kg. Specific melt viscosity in calculated by dividing 53,150 by the extrusion rate (g/min.).

(c) Melting point

Perkin-Elmer DSC II type is used. A copolymer is heated from a room temperature at a rate of 10° C./min., and the peak value of the melting curve is assigned to a melting point.

(d) MIT flex resistance

The flex resistance of a quenched film of about 0.20 to 0.23 mm in thickness is measured by means of a standard MIT flex endurance tester. The film of about 90 mm in length and 12.7 mm in width is attached to the jaws of the tester and kept under the load of 1.25 kg. The film is bent with an angle of 135° to both sides at a rate of about 175 cycles/min. and the number of the cycles before the film is broken is recorded. The test is repeated twice with one kind of the copolymer and the results are averaged. If the first and second results differ by larger than 25%, the third test is carried out, and all the three results are averaged.

EXAMPLE 1

In a glass-lined autoclave equipped with a stirrer, which can contain 30 parts of water, demineralized and deaerated pure water (10 parts) and sodium hydrogen carbonate (0.01 part) were charged. The interior was replaced thoroughly with pure nitrogen and evacuated. Thereafter, n-3VE (0.12 part) was injected, followed by HFP (10 parts). The mixture in the autoclave was stirred at 24° C. Then, the autoclave was pressurized with TFE to 8.3 Kg/cm$^2$G. As soon as di(omega-hydrododecafluoroheptanoyl)peroxide (hereinafter referred to as "DHP") (0.025 part) was injected, the reaction was initiated. During the reaction period, TFE was injected to keep the pressure at 8.3 Kg/cm$^2$. After 3 hours from the reaction initiation, DHP (0.025 part) was injected, and after 8, 13 and 18 hours from the reaction initiation, DHP (0.005 part each) was injected. Further, after 3, 5, 9 and 14 hours from the reaction initiation, methanol (0.16 part each) as a chain transfer agent was added to control the molecular weight of the copolymer. After the reaction was continued for 21 hours, unreacted monomers and polymer particles were recovered. The particles were washed with water by means of a mixer and dried at 120° C. for 24 hours to obtain the copolymer (9.2 parts).

Composition of the copolymer: HFP, 10.3%; n-3VE, 0.8%. M.P. 272° C. Specific melt viscosity 2.5×10$^4$ poise. The film of the composition has a MIT flex resistance of 5,250 cycles.

EXAMPLE 2

In a glass-lined autoclave equipped with a stirrer, which can contain 800 parts of water, demineralized and deaerated pure water (145 parts) and sodium hydrogen carbonate (0.1 part) were charged. The interior was replaced thoroughly with pure nitrogen and evacuated. Thereafter, n-3VE (1.8 parts) was injected, followed by HFP (145 parts). The mixture in the autoclave was stirred at 24° C. Then, the autoclave was pressurized with TFE to 8.3 Kg/cm$^2$G. As soon as DHP (0.36 part) was injected, the reaction was initiated. During the reaction period, TFE was injected to keep the pressure at 8.3 Kg/cm$^2$. After 3 hours from the reaction initiation, DHP (0.36 part) was injected, and after 8, 13, 18 and 23 hours from the reaction initiation, DHP (0.07 part each) was injected. Further, after 4, 9, 15.5 and 22.5 hours from the reaction initiation, methanol (2.6 parts each) as a chain transfer agent was added to control the molecular weight of the copolymer. After the reaction was continued for 25 hours, unreacted monomers and polymer particles were recovered. The particles were washed with water by means of a mixer and dried at 120° C. for 24 hours to obtain the copolymer (96 parts).

Composition of the copolymer: HFP, 9.7%; n-3VE, 0.8%. M.P. 270.5° C. Specific melt viscosity $1.8 \times 10^4$ poise. The film of the composition has a MIT flex resistance of 5,010 cycles.

EXAMPLE 3

In the same manner as in Example 1 but using a compound of the formula:

$$CF_2=CF-O-(CF_2)_7-CF_3$$

(hereinafter referred to as "n-7VE") (0.12 part) in place of n-3VE and continuing the reaction for 19 hours, the reaction was effected to obtain the copolymer (9.1 parts).

M.P. 269° C. Specific melt viscosity $2.8 \times 10^4$ poise. The film of the composition has a MIT flex resistance of 6,530 cycles.

COMPARATIVE EXAMPLE 1

In the same manner as in Example 1 but using no perfluoroalkyl vinyl ether, initially pressurizing the autoclave with TFE to 8.4 Kg/cm$^2$, adding DHP (0.014 part) to initiate the reaction and DHP (0.003 part each) after 8, 13 and 18 hours from the reaction initiation, and adding methanol (0.12 part each) after 5, 10 and 15 hours from the reaction initiation, the reaction was effected to obtain the copolymer (6 parts).

Composition of the copolymer: HFP, 11.5%. M.P. 271° C. Specific melt viscosity $7.7 \times 10^4$ poise.

COMPARATIVE EXAMPLE 2

In a glass-made autoclave equipped with a stirrer, which can contain 1,000 parts of water, demineralized and deaerated pure water (260 parts) and methanol (40 part) were charged. The interior was replaced thoroughly with pure nitrogen and evacuated. Thereafter, n-3VE (4.1 parts) was injected, followed by 1,2-dichloro-1,1,2,2-tetrafluoroethane (130 parts) and HFP (130 parts). The mixture in the autoclave was stirred at 25° C. Then, the autoclave was pressurized with TFE to 8.0 Kg/cm$^2$G. As soon as DHP (0.57 part) was injected, the reaction was initiated. During the reaction period, TFE was injected to keep the pressure at 8.0 to 7.5 Kg/cm$^2$. After the reaction was continued for 3.2 hours, unreacted monomers and polymer particles were recovered. The particles were washed with water by means of a mixer and dried at 120° C. for 24 hours to obtain the copolymer (55.6 parts).

Composition of the copolymer: HFP, 5.2%; n-3VE, 1.3%. M.P. 297° C. Specific melt viscosity $2.4 \times 10^4$ poise. The film of the composition has a MIT flex resistance of 52 cycles.

EXAMPLE 4

Each copolymer obtained in Examples 1 and 2 and Comparative Examples 1 and 2 was shaped into pellets, each having a diameter of about 3.0 mm and a length of about 3.0 mm and coated with a thickness of 0.15 mm on a wire having a diameter of 0.7 mm by means of an extruder for wire coating under the following conditions:

| Extruder for wire coating | |
|---|---|
| Diameter of cylinder | 30 mm |
| L/D of screw | 22 |
| Compression ratio | 2.85 |
| Inner diameter of die/ outer diameter of tip | 10 mm/7 mm |
| Temperature in cylinder | |
| rear | 350° C. |
| middle | 370° C. |
| front | 380° C. |
| Temperature in die neck | 380° C. |
| Temperature in die head | 390° C. |
| Temperature in die nozzle | 400° C. |

Coated wire was produced with a drawdown ratio of 100, which was calculated according to the following equation:

$$\text{Drawdown ratio} = \frac{D_d^2 - D_g^2}{D_{cw}^2 - D_w^2}$$

wherein $D_d$ is an inner diameter of the opening die, $D_g$ is an outer diameter of the tip, $D_{cw}$ is an outer diameter of the coated wire and $D_w$ is an outer diameter of the uncoated wire.

Evaluation of coating rate

With increasing the extrusion rate, the coated wire was drawn at a rate at which no melt fracture was observed on the inner surface of the extruded copolymer to form the coated wire with an outer diameter of 1.0 mm. Such drawing rate was the wire coating rate (m/min.).

Stress crack test by winding around wire

The coated wire was cut to the length of 120 mm. Three cut wires were each wound around three mandrels having a diameter of 1.4 mm, 2.0 mm and 3.0 mm respectively and heated in an electric furnace kept at 230° C. for 15 hours. After cooled in the air for 30 minutes, the wires were unwound and rewound around the same mandrels in the reverse direction. Then, they were heated again in the electric furnace kept at 230° C. for 15 hours. The wires were cooled in the air and unwound. The formation of crack on the coating was inspected.

The results are shown in Tables 1 and 2.

TABLE 1

| Copolymer | Maximum coating rate (m/min.) | Tensile strength | |
|---|---|---|---|
| | | T.S. (kg/mm$^2$) | Elongation (%) |
| Example 1 | 60 | 2.21 | 478 |
| Example 2 | 75 | 2.24 | 452 |
| Comparative Example 1 | 20 | 2.18 | 424 |
| Comparative Example 2 | Immeasurable due to variation | Immeasurable due to fragility of copolymer | |

(Uniform coating impossible due

TABLE 1-continued

| Copolymer | Maximum coating rate (m/min.) | Tensile strength T.S. (kg/mm$^2$) | Elongation (%) |
|---|---|---|---|
| | | to fragility of copolymer | |

TABLE 2

| Copolymer | No. of cracked samples/ No. of tested samples | | |
|---|---|---|---|
| | 1.4 mm | 2.0 mm | 3.0 mm |
| Example 1 | 5/5 | 0/5 | 0/5 |
| Example 2 | 5/5 | 2/5 | 0/5 |
| Comparative Example 1 | 5/5 | 5/5 | 5/5 |
| Comparative Example 2 | Immeasurable (Uniform coating impossible due to fragility of copolymer) | | |

What is claimed is:

1. A film of a fluorine-containing copolymer comprising monomeric units of:

(a) 8 to 15% by weight of hexafluoropropene on the basis of the weight of the copolymer, (b) 0.2 to 2% by weight of a fluoroalkyl vinyl ether of the formula:

$$CF_2=CF-O-(CF_2)n-CF_2X$$

wherein X is hydrogen or fluorine, and n is an integer of 3 to 9, on the basis of the weight of the copolymer, and (c) the balance of the copolymer comprising tetrafluoroethylene, said copolymer having a specific melt viscosity of at least $0.5 \times 10^4$ poise, said film derived therefrom having a good flex resistance of at least 3,000 cycles of bending without being broken when subjected to a MIT flex resistance test.

2. A copolymer according to claim 1, wherein the composition of the monomeric units is 9 to 13% by weight of hexafluoropropene, 0.3 to 1.5% by weight of the fluoroalkyl vinyl ether (I) and the balance of tetrafluoroethylene.

3. A copolymer according to claim 1, wherein n in the formula (I) is an integer of 3 to 7.

4. A copolymer according to claim 1, which has a specific melt viscosity of at least $1 \times 10^4$ poise.

5. A film according to claim 1, which has at least 5,000 cycles of a MIT flex resistance.

* * * * *